(12) United States Patent
Son et al.

(10) Patent No.: US 6,441,907 B1
(45) Date of Patent: Aug. 27, 2002

(54) HIGH ACCURACY RING LASER INTERFEROMETER USING AN EXTERNAL CAVITY RING LASER

(75) Inventors: Jung Young Son, Sun-Nam Si (KR); Ivan A. Stlilets, Kiev (UA); Yong Jin Choi; Ji Eun Ban, both of Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/564,533

(22) Filed: May 4, 2000

(30) Foreign Application Priority Data

Jun. 14, 1999 (KR) .............................................. 99-21962

(51) Int. Cl.$^7$ .................................................. G01B 9/02
(52) U.S. Cl. ........................ 356/484; 356/486; 356/517
(58) Field of Search ................................ 356/450, 459, 356/472, 484, 486, 517; 350/483

(56) References Cited

U.S. PATENT DOCUMENTS 3,697,181 A * 10/1972 Macek et al. ................ 356/472
4,551,021 A * 11/1985 Callaghan et al. ........... 356/473
4,740,085 A * 4/1988 Lim ............................ 356/472
4,807,998 A * 2/1989 Weber ......................... 356/472
4,846,574 A * 7/1989 Upton ......................... 356/472
6,034,770 A    3/2000 Kim et al.

* cited by examiner

*Primary Examiner*—Samuel A. Turner
(74) *Attorney, Agent, or Firm*—Oblon, Spivak, McClelland, Maier & Neustadt, P.C.

(57) ABSTRACT

An optical sensing apparatus for use in a ring laser interferometer measuring a physical quantity of an object includes a ring laser cavity formed by several internal mirrors, of which at least two internal mirrors are partly light-transmitting. The ring laser cavity generates two laser beams of an identical wavelength, the two laser beams propagating in counter direction to each other in the ring laser cavity. External mirrors are disposed at a distance from the ring laser cavity, whereby portions of the two laser beams, which pass through the internal mirrors and travel on optical paths toward the external mirrors, are reflected back into the ring laser cavity. The apparatus further includes at least one platform for mounting the external mirrors.

49 Claims, 10 Drawing Sheets

HIGH ACCURACY RING LASER INTERFEROMETER USING AN EXTERNAL CAVITY RING LASER

BACKGROUND OF THE INVENTION

1. Field of the Invention

The present invention generally relates to an interferometer using a ring laser; and, particularly, a high accuracy interferometer including external cavity where two beams provided from a ring laser gyroscope through two mirrors are sent back to the ring laser by using external mirrors separated from the ring laser by a certain distance and the length of the external cavity is controlled by a physical quantity to be measured; and, more particularly, an interferometer where the physical quantity is measured by counting the number of pulses generated by interference of two beams propagating in opposite directions in the ring laser, such number being determined by the length of the external cavity. In the interferometer of the present invention, a lock-in zone is broadened by fixing the ring laser and increasing only back scattering of the ring laser so that the interferometer operates in the lock-in zone and the oscillating frequency of the interferometer rarely changes.

2. Description of the Related Art

There are various kinds of laser interferometers which commonly utilize the coherency of laser beams. In a laser interferometer, a laser beam from one source is split into two beams, one of which is made to propagate as a base wave and the other is modulated by a physical quantity to be measured. The two beams are later combined to generate interference fringes whose shape, number, variation in time and interval are assessed to identify the physical quantity such as refractive index, displacement, length and density. Alternatively, known interference fringes are projected to an object so that the shape or surface profile of the object is measured by analyzing the variation of the fringe shape. Typically, in order to get more accurate measurement results, each interference fringe is partitioned into fine sections with equal intervals so that the measurement results may be provided in digital form.

A ring laser gyroscope measures its angular velocity by counting the number of time-variations of beat resulting from a difference of oscillating frequencies of two counter propagating beams in a ring-shaped resonator. Specifically, when a ring laser gyroscope rotates, effective length of the resonator for a beam propagating in the same direction with the rotation is lengthened while that for the other beam propagating in the counter direction is shortened, which phenomenon is known as Sagnac effect. This difference in effective length results in difference of the center frequencies of the two beams so that addition of the two beams provides beat from which angular velocity can be measured in high accuracy.

The accuracy of the angular velocity of the ring laser gyroscope have reached around 0.001 degree/hour. When the ring laser gyroscope rotates below a certain angular velocity, the frequency difference between the two beams is very small so that the two beams oscillate at a same frequency. Such range of low angular velocities is called "lock-in zone," which means that the two beams are locked in to each other. The locking-in of the beams results from the fact that mirrors in the ring laser gyroscope scatter part of each beam in the opposite direction from an original direction so that the scattered beam is added to the other beam propagating in the counter direction. This scattered beam is called "back scattering wave," and as the intensity of the back scattering wave becomes larger, the lock-in zone becomes broader. When the ring laser gyroscope is operated in the lock-in zone, it is simply a ring laser because there is neither a frequency difference nor beat. The ring laser is constructed by making a resonator in the form of a polygon having 3, 4 or more sides by using mirrors. There are usually two beams with identical wavelength in the ring laser, one of them propagating clockwise and the other propagating counterclockwise.

SUMMARY OF THE INVENTION

An object of the present invention is, therefore, to provide a high accuracy measurement system capable of measuring various physical quantities by using a ring laser and method for using the same.

Another object of the present invention is to provide an interferometer employing a ring laser where the effect of minute movement of the ring laser is minimized on the measurement.

In accordance with one aspect of the present invention, there is provided a ring laser interferometer including an external cavity ring laser where part of each of two beams propagating in opposite directions is outputted from the ring laser through a corresponding mirror and is injected back into the ring laser as back propagating wave by using an external mirror, thereby broadening the lock-in zone. In the ring laser interferometer of the present invention, the length of an optical path, that is, the distance between the external mirror and the ring laser is controlled by the physical quantity to be measured. Then the quantity is identified by counting variation rate in the number of interference fringes which are caused by intensity and phase changes of the two counter propagating waves according to the control of the optical path length.

By inserting an attenuator between the external mirror and the ring laser, the intensity of each back propagating wave can be controlled externally to operate the ring laser only in the lock-in zone. The physical quantities to be measured include displacement, length, position, temperature, refractive index or pressure.

The output from the inventive interferometer is variation rate in interference fringe which depends on intensity sum and difference, and phase difference, of the output beams of the two counter propagating waves, parts of which are fed back to suppress or compensate the effect of fluctuation in applied voltage or other external factors to enable high accuracy measurement. As the ring laser operates in the lock-in zone, the effect of minute movements of the laser on the measurement result can be minimized.

In accordance with one aspect of the present invention, there is provided an optical sensing apparatus for use in a ring laser interferometer for measuring physical quantity, comprising a ring laser cavity resonator; and at least one external mirror, wherein the ring laser cavity resonator includes a plurality of internal mirrors; the ring laser cavity includes two laser beams having a same wavelength and propagating in opposite direction to each other; part of each of the two counter propagating laser beams is transmitted through one of the internal mirrors; and is reflected by one of the external mirrors to generate two back propagating waves, each of which is injected to the ring laser cavity along path of the corresponding transmitted beam through the corresponding one of the selected internal mirrors; and the optical path from each of the selected internal mirrors to the corresponding external mirror is changed based on the physical quantity to be measured.

And also, there is provided an interferometer comprising the optical sensing apparatus described above, at least one platforms for changing the optical paths; a counting unit for counting the number of pulses of a waveform given by variation rate in time of the waveform generated by the intensity difference between the two counter propagating waves in the ring laser cavity based on the change of the optical paths, wherein the physical quantity to be measured is determined from the counted number of the pulses.

BRIEF DESCRIPTION OF THE DRAWINGS

The aforementioned aspect and other features of the invention are explained in the following description, taken in conjunction with the accompanying drawings wherein.

DETAILED DESCRIPTION OF THE INVENTION

Figure 1:
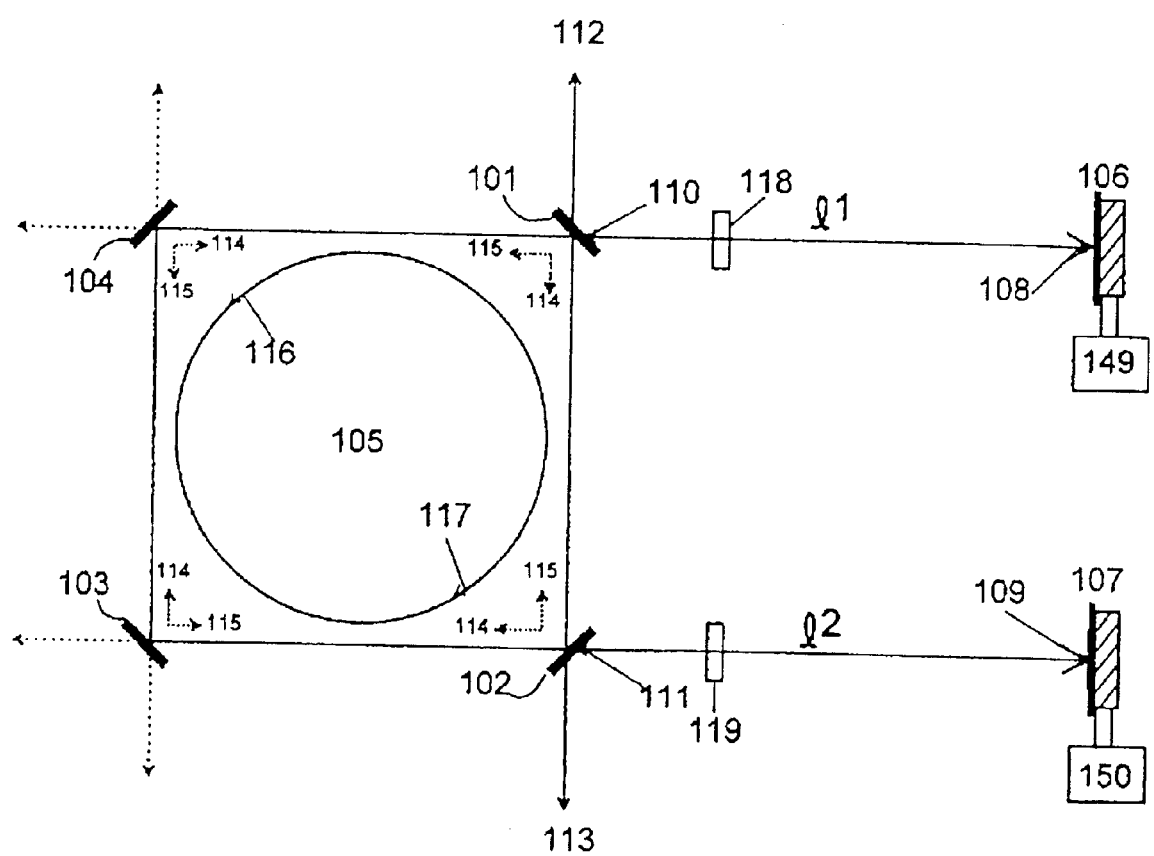
FIG. 1 shows a diagram of the structure of an external cavity ring laser having an ordinary four mirror ring laser with an external mirror.

FIG. 1 shows a basic structure of an optical sensing unit of the present invention, which is constructed by adding external mirrors 106 and 107 to a conventional four mirror ring laser 105. In case the transmissivity of internal mirrors 101 to 104 in a ring laser 105 is not 0, part of each of counter propagating beams in the ring laser 105, that is, clockwise ("CW") propagating beam 117 and counterclockwise ("CCW") propagating beam 116, is transmitted out through the internal mirrors 101 to 104. For example, part of the CW propagating beam 117 is transmitted through mirrors 101 and 102 to become beams 108 and 113, respectively. Similarly, part of the CCW propagating beam 116 is transmitted through mirrors 101 and 102 to become beams 112 and 109, respectively. Two beams are selected, one of which is from the CCW 116 and the other of which is from the CW 117. For example, the beam 108 originated from the beam 117 is selected out of the beams 108 and 112 transmitted through the mirror 101 and the beam 109 originated from the beam 116 is selected out of the beams 109 and 113 transmitted through the mirror 102. Then, each of the two selected transmitted beams 108 and 109 is returned by using the external mirrors 106 and 107 as the beams 110 and 111 respectively, to the ring laser 105. And each of the returning beams 110 and 111 travels functions as a back propagating wave.

The amplitudes of the back propagating waves 110 and 111 can be controlled by providing optical attenuators 118 and 119 in the optical paths. When the ring laser 105 is fixed and the back travelling waves enters the ring laser 105 by using the external mirrors 106 and 107, intensity difference between the other beams 112 and 113 transmitted respectively from the external mirrors 106 and 107 is a function of the distances $l_1$ and $l_2$ between the external mirrors 106, 107 and its corresponding internal mirrors 101 and 102, respectively. Each of the external mirrors 106 and 107 is mounted, respectively, on platforms 149 and 150 which can be moved in the direction of the transmitted beams 108 and 109 or of the back propagating waves 110 and 111 as needed. Under the condition that the moving speeds of the external mirrors 106 and 107 are below several cm/sec, $I_1-I_2$, $I_1$ and $I_2$ representing the intensity of the transmitted beams 112 and 113, respectively, is determined as follows:

$$I_1 - I_2 = \frac{2M}{\tilde{\alpha}-\tilde{\beta}}\left[M_1\sqrt{1-\frac{\tilde{\Omega}^2}{\Omega_0^2}} + (\tilde{b}M + M_2)\frac{\tilde{\Omega}}{\Omega_0}\right] + \frac{2\delta}{\tilde{\alpha}-\tilde{\beta}} \quad \text{Eq. (1)}$$

where $\alpha$ and $\beta$ are obtained by dividing imaginary parts of self and cross saturation coefficients of nonlinear polarizability of gain medium in the ring laser 105 with normalized pumping parameter $(\eta-1)/\eta$ of the ring laser; $\delta$ represents relative difference between the pumping parameters of the two counter propagating beams 116 and 117; $\Omega$ represents the angular velocity of the ring laser 105; and M, $M_1$ and $M_2$ are functions defined by the back propagating beams 110 and 111 from the external mirrors 106 and 107 and back propagating beams 114 and 115 produced by the internal mirrors 101 to 104. Specifically, M, $M_1$ and $M_2$ are as follows:

$$M = \frac{1}{2}\sqrt{\tilde{m}_1^2 + 2\tilde{m}_1\tilde{m}_2\cos(\theta_1-\theta_2) + \tilde{m}_2^2} \quad \text{Eq. (2)}$$

$$M_1 = \frac{\tilde{m}_1^2 - \tilde{m}_2^2}{4M} \text{ and} \quad \text{Eq. (3)}$$

$$M_2 = \frac{\tilde{m}_1\tilde{m}_2}{2M}\sin(\theta_1-\theta_2) \quad \text{Eq. (4)}$$

In Eqs. (2) to (4), $\tilde{m}_1$ and $\tilde{m}_2$ are obtained by dividing the intensities of the back propagating waves produced by the external mirror and the internal mirrors with $\Delta\omega=(\omega(\eta-1))/Q$, that is, the line width of the ring laser.

$$\tilde{m}_1 e^{-i\theta_1} = m_1^{(ext)} e^{-i\xi_1} + m_1^{(int)} e^{-i\epsilon_1} \quad \text{Eq. (5)}$$

$$\tilde{m}_2 e^{-i\theta_2} = m_2^{(ext)} e^{-i\xi_2} + m_2^{(int)} e^{-i\epsilon_2} \quad \text{Eq. (6)}$$

In Eqs. (5) and (6), $\theta_i$ (i=1, 2) is phase of the overall back propagating waves given to the ring laser; $m_i^{(ext)}$ and $m_i^{(int)}$ (i=1, 2) are amplitudes of light which travels back or is scattered from the external mirrors and the internal mirrors, respectively, divided by $\Delta\omega$, wherein $m_i^{(ext)} \gg m_i^{(int)}$. $\epsilon_i$(i=1, 2) is a phase of the back scattering waves produced by internal mirrors; and $\xi_i$(i=1,2) is a phase determined by the distance between the external mirrors and the ring laser. And $\Omega_0$ is a rotational angular velocity corresponding to the lock-in frequency and can be determined as follows:

$$\Omega_0 = \sqrt{\tilde{b}^2 M^2 + 2\tilde{b}MM_2 + M_3^2} \qquad \text{Eq. (7)}$$

In the present invention, the ring laser is fixed and the back propagating waves are injected into the ring laser by the external mirrors. In this case, because $\Omega=0$, $\delta$ is very small and the center frequency of the ring laser is rarely changed by the back propagating waves. Thus, $\tilde{b}=0$ and Eq. (2) may be simplified as follows:

$$I_1 - I_2 = \frac{\tilde{m}_1^2 - \tilde{m}_2^2}{2(\tilde{\alpha} - \tilde{\beta})(\Omega_0 + \Omega_1)} \qquad \text{Eq. (8)}$$

wherein $\Psi_1$ is first perturbation constant of $\Psi_0$ given as follows:

$$\Omega_0 = \frac{1}{2}\sqrt{\tilde{m}_1^2 - 2\tilde{m}_1\tilde{m}_2\cos(\theta_1 - \theta_2) + \tilde{m}_2^2} \qquad \text{Eq. (9)}$$

$\Omega_0$ is not less than 0 and its maximum and minimum values are given as $\tilde{m}_1+\tilde{m}_2$ and $|\tilde{m}_1-\tilde{m}_2|$ when $\cos(\theta_1-\theta_2)$ equals 1 and −1, respectively. When $l_1$ and $l_2$ denote the distances between the ring laser and the two external mirrors, respectively, and $l_0$ denotes the distance between two neighboring mirrors in the ring laser, $\xi_1=\xi_1^{(0)}+2k(l_1-l_0)(\xi_1^{(0)}$ is the initial value of $\xi_1$; $k=2\pi n/\lambda_a$ is a wave number where n is the diffraction coefficient of a medium filling the space between the ring laser and the external mirrors; and $\lambda_a$ is the wavelength of the ring laser output beam in the air) and $\xi_2 \xi_2^{(0)}-2l_2 k(\xi_2^{(0)}$ is the initial value of $\xi_2$). In addition, if $m_1^{(ext)}=m_2^{(ext)}=m^{(ext)}$ and $m_{1(int)}=m_2^{(int)}=m^{(int)}$ and $\Omega_1$ is much smaller than $\Omega_0$, when the medium is air(n=1), Eq. (6) may be simplified as follows:

$$I_1 - I_2 = \frac{C}{\Omega_0(\tilde{\alpha}-\tilde{\beta})}\sin\pi\left(2\frac{l_1-l_2}{\lambda_a}-\zeta_1\right)\sin\pi\left(2\frac{l_1+l_2}{\lambda_a}-\zeta_2\right) \qquad \text{Eq. (10)}$$

wherein C is a constant which is defined as a multiplication of $m^{(ext)}$ and $m^{(int)}$, and $\xi_i$(i=1, 2) is phase component which is defined by difference and sum of $\epsilon_i$(i=1,2), $\xi_i^{(0)}$ (i=1, 2) and $kl_0$. The phase difference $\phi$ between two counter propagating beams 116 and 117, caused by the back propagating waves 110 and 111 from the external mirrors 106 and 107, is as follows:

$$\phi = \pi + \tan^{-1}\left[\frac{\tilde{m}_1\cos(\theta_1)-\tilde{m}_2\cos(\theta_2)}{\tilde{m}_1\sin(\theta_1)-\tilde{m}_2\sin(\theta_2)}\right] \qquad \text{Eq. (11)}$$

The phase difference above in Eq. (11) can be detected by making two projection beams from one mirror of the ring laser interfere each other. If we let $I_a$ and $I_b$ be the intensities of the two projection beams, $I_{Fringe}$, a signal produced from the interference of the two projection beams, is given as follows:

$$I_{Fringe} = I_a + I_b + 2\sqrt{I_a I_b}\cos(\phi+\phi_0) \qquad \text{Eq. (12)}$$

wherein $\phi_0$ is a phase value caused in the course of making two beams interfere. As Eq. (12) is a function of $\phi$, it depends on the values of $l_1$ and $l_2$. Thus, by measuring the variation of the interference fringe, i.e the change of $I_{Fringe}$ due to change of $l_1$ and $l_2$, the variation of $l_1$ or $l_2$ can be measured. In case there is no back propagating waves caused by the external mirrors in the ring laser, the intensities of the two counter propagating beams are almost identical with each other. Defining this intensity as $I_0$, $I_0$ is given as follows:

$$I_0 = \frac{1}{\tilde{\alpha}+\tilde{\beta}} \qquad \text{Eq. (13)}$$

If we normalize Eq. (10) by dividing by $I_0$, we get the following equation.

$$\frac{I_1-I_2}{I_0} = \frac{C(\tilde{\alpha}+\tilde{\beta})}{\Omega_0(\tilde{\alpha}-\tilde{\beta})}\sin\pi\left(2\frac{l_1-l_2}{\lambda_a}-\zeta_1\right)\sin\pi\left(2\frac{l_1+l_2}{\lambda_a}-\zeta_2\right) \qquad \text{Eq. (14)}$$

Since $\alpha$ and $\beta$ are values representing the characteristic of the oscillating medium in the ring laser, and thus are not related to $l_1$ and $l_2$, Eqs. (10) and (14) represents waveforms of the same shape. The Eq. (14) includes four operating regions. In the first operating region, one of $l_1$ and $l_2$ varies and in the second operating region, $l_1-l_2$ is constant. And in the third operating region, $l_1+l_2$ is constant and in the fourth operating region, both of $l_1$ and $l_2$ varies. In the second operating region, that is, in the case $l_1-l_2$ is constant, the Eq (10) will be represented by a function of $l_1+l_2$. In the third region, that is $l_1+l_2$ is constant, the Eq (10) will be represented by a function of $l_1-l_2$.

Figure 2:
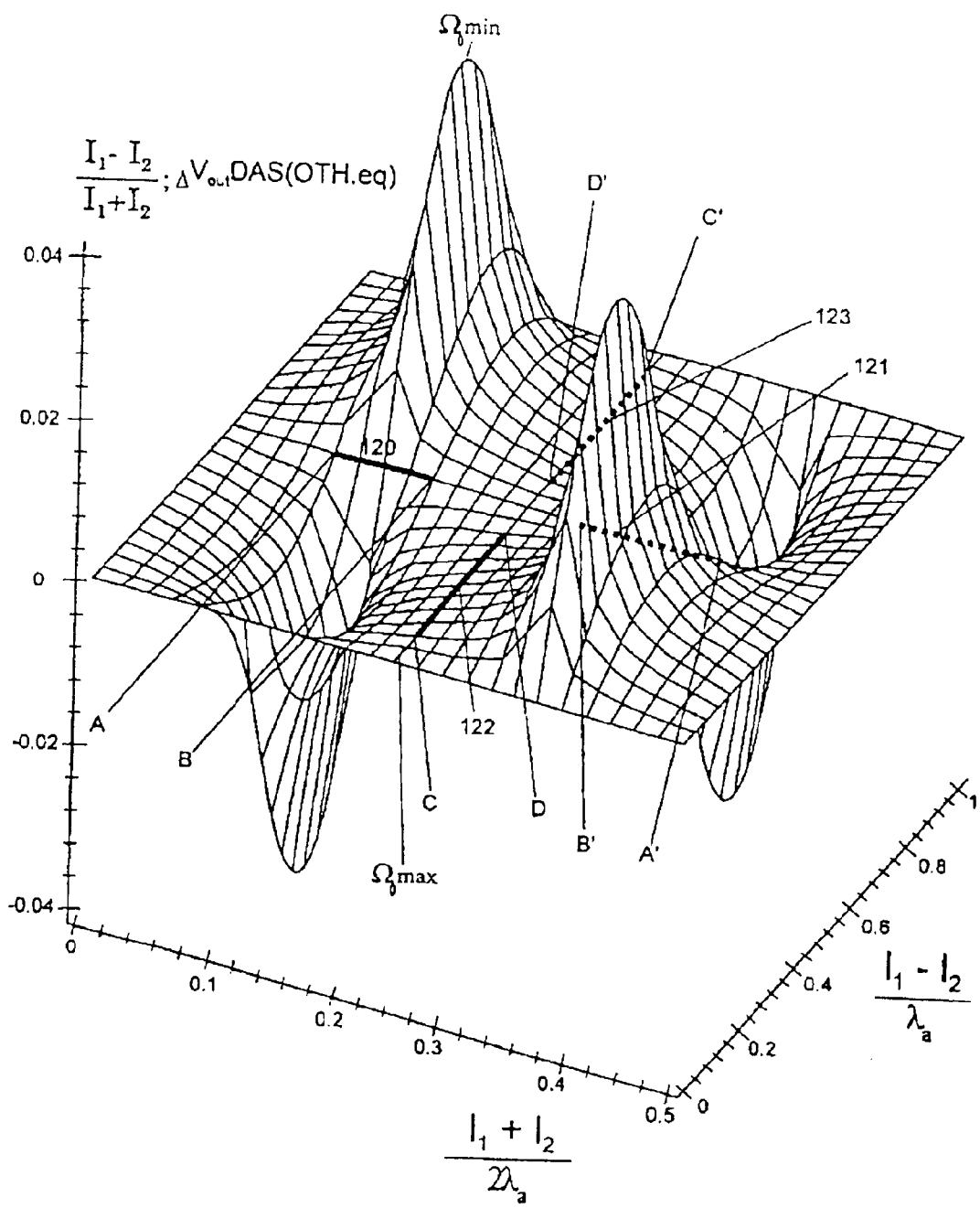
FIG. 2 represents a 3 dimensional plot of Eq. (14) with axis of $(l_1-l_2)/\lambda_a$ and $(l_1+l_2)/2\lambda_a$.
Figure 3A:
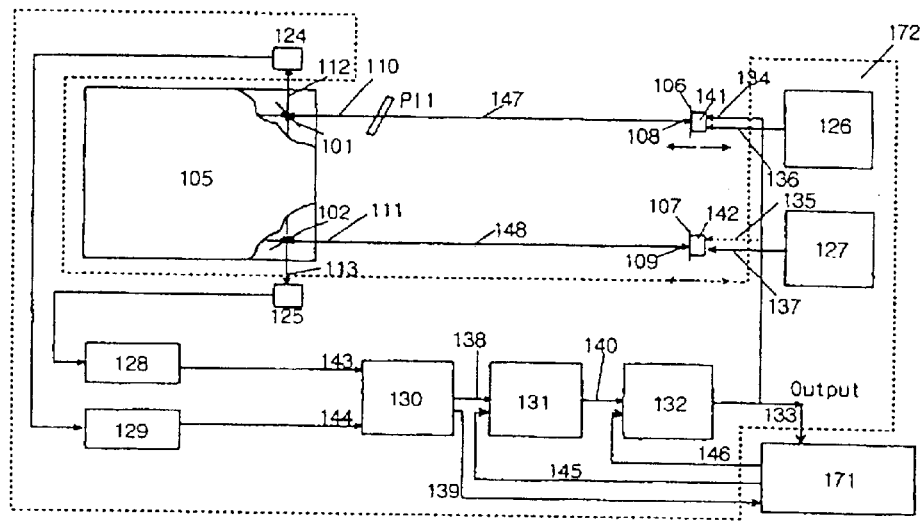
FIGS. 3A and 3B depict schematic diagrams of a ring laser interferometer stabilizing circuit.
Figure 3B:
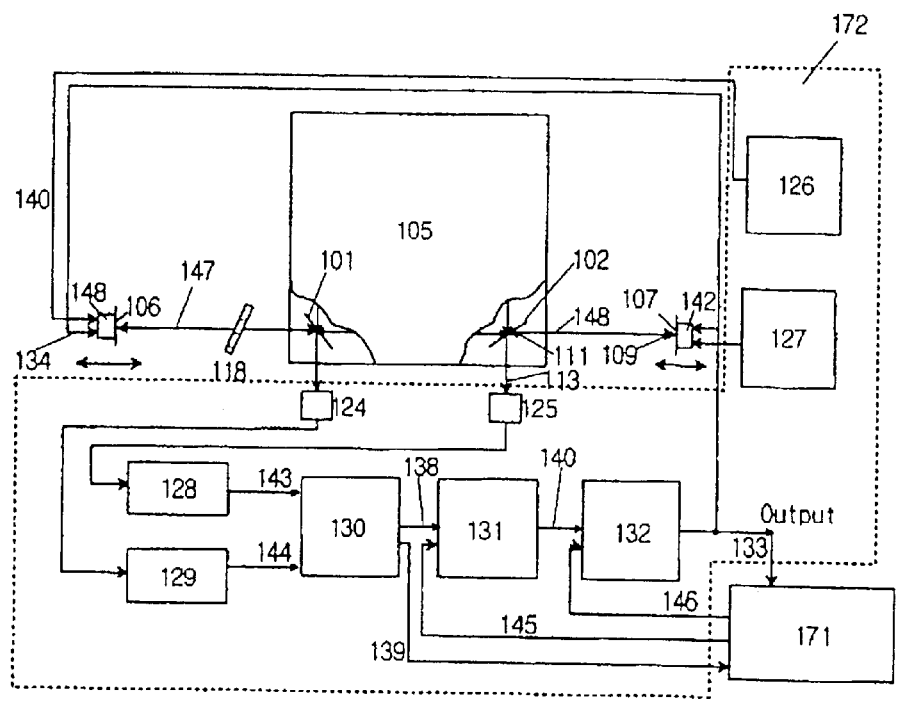

FIG. 2 shows a 3 dimensional plot of the Eq. (14), which has two axes of $(l_1-l_2)/\lambda_a$ and $(l_1+l_2)/2\lambda_a$. In FIG. 2, there is provided the operating region of the interferometer when $l_1-l_2$ or $l_1+l_2$ is constant. It is important to achieve as large value for the Eq. (14) as possible by placing the range of $(l_1-l_2)/\lambda_a$ on a line CD 122 or a line C'D' 123 in case of the constant $l_1-l_2$ and by placing the range of $(l_1+l_2)/2\lambda_a$ on a line AB 120 or a line A'B' 121 in case of the constant $l_1-l_2/2\lambda_a$. That is, measurement accuracy is improved when the peak value of the waveform of the intensity difference between two counter propagating waves is maximized. FIGS. 3A and 3B are schematic diagrams of the optical sensing unit and the optical stabilization unit of the ring laser interferometer to measure physical quantity of the object by using Eq. (10) in accordance with the present invention. FIG. 3A is a schematic diagram where one of $l_1$ or $l_2$ varies by the physical quantity to be measured or the external mirrors are moved simultaneously to make $l_1-l_2$ constant. FIG. 3B is a schematic diagram where event two external mirrors are moved interactively to make $l_1+l_2$ constant.

In FIG. 3A, The beam 108 is part of the two counter propagating beams in the ring laser 105 are transmitted through one mirror 101 of the two neighboring mirrors 101 and 102 in the ring laser 105. The transmitted beam 108 is reflected by the external mirror 106 separated by $l_1$ from the ring laser 105 to thereby reverse its travel direction. Thus, the transmitted beam 108 becomes the back propagating wave 110 returning to the ring laser 105 through the mirror 101. The transmitted beam 112 is detected by a photo detector 124 which outputs a voltage proportional to the intensity of the transmitted beam 112. The output of the photo detector 124 is amplified by a pre-amplifier 128 and then applied to one of input terminals 143 of a difference amplifier 130.

Similarly to the transmitted beam 108, the transmitted beam 109 through the mirror 102 is reflected by the external mirror 107 separated by $l_2$ from the ring laser 105 to thereby inverse its travel direction. Thus, the transmitted beam 109 becomes the back propagating wave 111 back to the ring laser 105 through the mirror 102. The transmitted beam 113 is detected by a photo-detector 125 which outputs voltage proportional to the intensity of the transmitted beam 113. The output of the photo-detector 125 is amplified by a pre-amplifier 129 and then applied to the other input terminal 144 of the difference amplifier 130. The photo-detector 125 has characteristic identical to the photo-detector 124. And also the pre-amplifier 129 has identical characteristic with the pre-amplifier 129.

The output waveform of the difference amplifier 130 is proportional to $I_1-I_2$ of the Eq. (10) and part of the output of the difference amplifier 130 is directly measured by a control and display unit 171. Regulated voltage supplies 126 and 127 are coupled to one input 136 of a piezo transducer 141 and one input 137 of the piezo transducer 142, where the applied voltage from the regulated voltage supplies 126 and 127 control the piezo transducers 141 and 142 finely so that the difference amplifier 130 outputs a maximum peak waveform. By this fine control, the operating range of the difference amplifier 130 is on the line CD 122, the line C'D' 123, the line AB 120, or the line A'B' 121. The selection of range of the CD 122 or the C'D' 123, or the AB 120 or the A'B' 121 depends on the polarization of the inputs 134 and 136 and the inputs 135 and 137 of the piezo transducers 141 and 142. The remaining part of the output of the difference amplifier 130 is integrated by an integrator 131. The integrated output is amplified by the output amplifier 132. The output of the output amplifier 132 is applied to the other input terminal 134 of the piezo transducer 141 attached on the external mirror 108 or the other input terminal 135 of the piezo transducer 142 attached on the external mirror 109. The inputs to one of the piezo transducers 141 and 142 stabilize the ring laser 105 so as to make $I_1-I_2$ zero, that is, minimize the difference between the intensities of the two counter propagating beams in the ring laser 105.

If the optical path for only one of $l_1$ and $l_2$ is varied by an object, the output of the output amplifier 132 is applied only to the piezo transducer associated with the variation, e.g., the transducer 141. If $l_1-l_2$ is constant, the output of the output amplifier 132 is applied to both of the piezo transducers 141 and 142. The integrator 131 separates the difference amplifier 130 from the output amplifier 132 and maintains for a predetermined time the output voltage of the output amplifier 132 applied to the piezo transducers 141 and 142 based on the output variation of the difference amplifier 130 so as to stabilize the interferometer and make accurate measurement. If there is not the integrator, measurement accuracy is degraded since the output of the difference amplifier 130 stays at constant value only in average. The output 133 of the output amplifier 132 is also applied to the control and display unit 171 of the interferometer in order to discharge the integrator 131 when the voltage of the integrator 131 reaches a predetermined level. In case $l_1-l_2$ or $l_1+l_2$ is constant, it is possible to supply the voltage by using selected one of the regulated voltage supplies 126 and 127 because the absolute value of the voltage applied from the regulated voltage supply 126 to the piezo transducer 141 should be equal to the absolute value of the voltage applied from the regulated voltage supply 127 to the piezo transducer 142. When the distances between the external mirrors 106 and 107 and the ring laser 105 are varied based on the physical quantity to be measured, the piezo transducers 141 and 142 attached on, respectively, the external mirrors 106 and 107 achieve stabilization of the interferometer by suppressing the variation of $l_1-l_2$ occurring due to disturbance generated in the ring laser 105.

Depending on constriction and expansion of the piezo transducers 141 and 142 based on the output of the output amplifier 132, the external mirrors 106 and 107 are moved in the direction of the transmitted beams 108 and 109 or the direction of the back propagating wave 110 and 111. Such that the distances between the external mirrors 106 and 107 and the ring laser 105 remain constant. The control and display unit 171 of the interferometer is coupled to the remaining input 145 of the integrator 131 to discharge the integrator 131 and coupled to the remaining input 146 of the output amplifier 132 to reset the output amplifier 132. The optical attenuator 118 placed within the optical path constructed by the mirror 101 and the external mirror 106 is to make the amplitudes of the back propagating waves from the external mirrors 106 and 107 identical with each other. The stabilization circuit 172 includes the photo detectors 124 and 125, the pre-amplifiers 128 and 129, the regulated voltage supplies 126 and 127, the difference amplifier 130, the integrator 131 and the output amplifier 132.

FIG. 3B is identical to FIG. 3A except that the two mirrors 106 and 107 moves relatively so that $l_1+l_2$ is constant. The amplification rate of the pre-amplifiers 128 and 129 is controlled to compensate difference between $_1$ and $l_2$ due to the difference between transmission rates of the mirrors 101 and 102.

Figure 4:
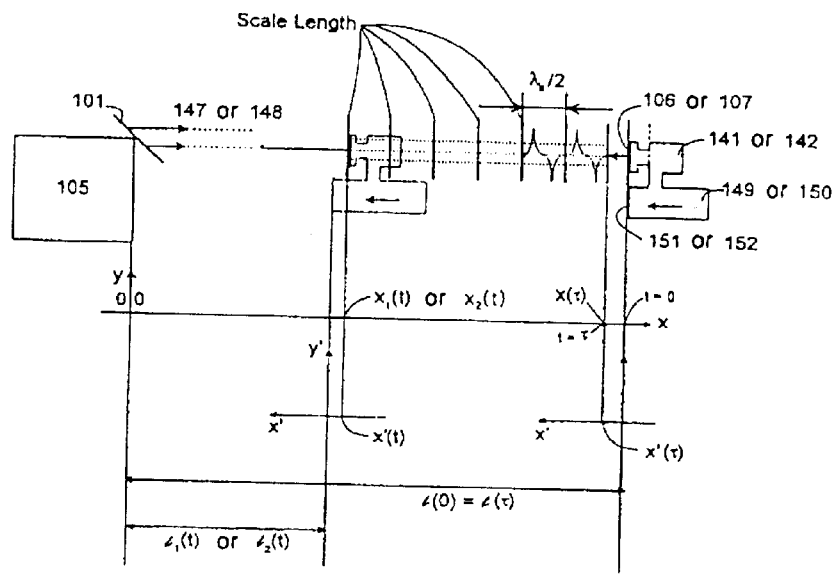
FIG. 4 illustrates a graphical diagram of time functions defined on a optical path between the external mirror and the ring laser.

FIG. 4 depicts time functions defined on the optical path between the external mirrors and the ring laser of the interferometer in accordance with the present invention. Since the optical path 147 or 148 varies depending on the physical quantity to be measured, the length thereof can be represented by the time function. $l_1(t)$ represents the distance between the mirror 101 of the ring laser 105 and the external mirror 106 when the voltage applied to the piezo transducer 141 is 0, $x_1(t)$ represents the distance between the mirror 101 of the ring laser 105 and the external mirror 106 when the voltage applied to the piezo transducer 141 is not 0, and $x'_1(t)$ represents the distance between the platform 149 on which the external mirror 106 is mounted and the external mirror 106. $l_1(t)$ can be expressed as follows:

$$l_1(t) = x_1(t) + x'_1(t) \qquad \text{Eq. (15)}$$

In Eq. (15), the positive direction of $x_1(t)$ is defined as opposite to that of $x'_1(t)$. Similarly as $l_1(t)$ represented by Eq. (15), $l_2(t)$ can be expressed as follows:

$$l_2(t) = x_2(t) + x'_2(t) \qquad \text{Eq. (16)}$$

In Eqs. (15) and (16), $x_1(t)$ and $x_2(t)$ are the distances between the ring laser 105 and the external mirrors 106 and 107 and are identical to $l_1$ and $l_2$ in Eqs. (10) and (14), respectively. In Eqs. (15) and (16), $x'_1(t)$ and $x'_2(t)$ are 0 at t=0 and then $l_1(0)=x_1(0)$ $l_2(0)=x_2(0)$. It may be preferable to set $l_1(0)$ and $l_2(0)$, respectively, as the distance between the ring laser 105 and the front side 151 of the platform 149 and the distance between the ring laser 105 and the front side 152 of the platform 150, respectively, and initially place the external mirror 106 at the same plane with the front side 151 of the platform 149 and the external mirror 107 at the same plane with the front side 152 of the platform 150. On the other hand, while t is not 0, the piezo transducer 141 operates to stabilize the interferometer and then x'$_1$(t) and x'$_2$(t) are product of voltage V$_1$(t) applied to the piezo transducer 141 and conversion coefficient k$_{p1}$(mm/volt) of the piezo transducer 141 and product of voltage V$_2$(t) applied to the piezo transducer 142 and conversion coefficient k$_{p2}$(mm/volt) of the piezo transducer 142, respectively.

$$x_i(t) = k_{pi} V_i(t) \quad \text{Eq. (17)}$$

where i is 1 or 2. Addition of Eqs. (15) and (16) and substitution Eq (17) result in $$x_1(t) + x_2(t) = (l_1(t) + l_2(t)) - (k_{p1} V_1(t) + k_{p2} V_2(t)) \quad \text{Eq. (18)}$$

and substraction Eq. (16) from Eq. (15) and substitution Eq. (17) result in $$x_1(t) - x_2(t) = (l_1(t) - l_2(t)) - k_{p1} V_1(t) - k_{p2} V_2(t) \quad \text{Eq. (19)}$$

When $l_1 - l_2$ is constant, that is, both of the external 106 and 107 are placed on the selected one of platforms and moved in same direction, it is possible to let V$_1$(t)=V$_2$(t)= V(t) since input voltages for one of the piezo transducers from the output amplifier 132 and the regulated voltage supplies 126 and 127 are identical to those for the other piezo transducer so that the following equation can be obtained.

$$x'_1(t) + x'_2(t) = (k_{p1} + k_{p2}) V(t) = 2 k_p V(t) \quad \text{Eq. (20)}$$

where k$_p$ is the average of k$_{p1}$ and k$_{p2}$. And also, since the two optical paths moves same distance simultaneously by the selected platform, $l_1(t) + l_2(t) = 2l(t)$, and since sin term(let it be C') including $l_1 - l_2$ is constant when $l_1 - l_2$ is constant. Thereby, Eq. (10) can be expressed as follows:

$$I_1 - I_2 = \frac{CC'}{\Omega_0 (\tilde{\alpha} - \tilde{\beta})} \sin\pi\left(2l(t) - \frac{k_p V(t)}{\lambda_a / 2} - \zeta_2\right) \quad \text{Eq. (21)}$$

To apply Eq. (21) to the interferometer, the external mirrors 106 and 107 identical with each other are driven by single platform.

In order to maintain $l_1 + l_2$ constant, the two external mirrors interact each other and $l_1$ and $l_2$ are moved in same direction in the structure as shown in FIG. 3B. Accordingly, x'$_1$(t) and x'$_2$(t) should be moved in the same direction. Thus, because the input voltage applied to the piezo transducer 141 should have opposite polarity compared to the input voltage applied to the piezo transducer 142, V$_1$(t)=−V$_2$(t)=V(t). Provided $l_1(t) - l_2(t) = 2\Delta l(t)$, then Eq. (10) can be expressed as follows:

$$I_1 - I_2 = \frac{CC''}{\Omega_0 (\tilde{\alpha} - \tilde{\beta})} \sin\pi\left(2\Delta l(t) - \frac{k_p V(t)}{\lambda_a / 2} - \zeta_1\right) \quad \text{Eq. (22)}$$

where C" represents the constant sin term including $l_1 + l_2$.

Figure 5A:
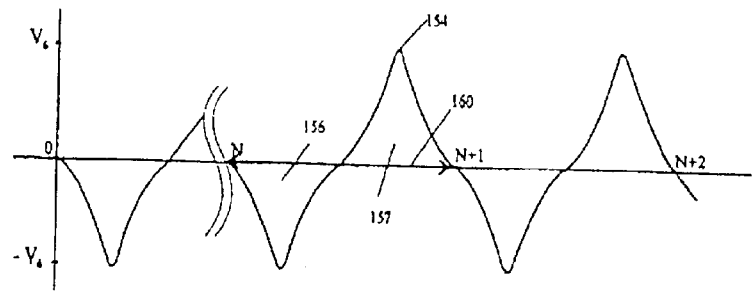
FIGS. 5A and 5B show waveforms illustrating the values of Eqs. (21) and (22), respectively.
Figure 5B:
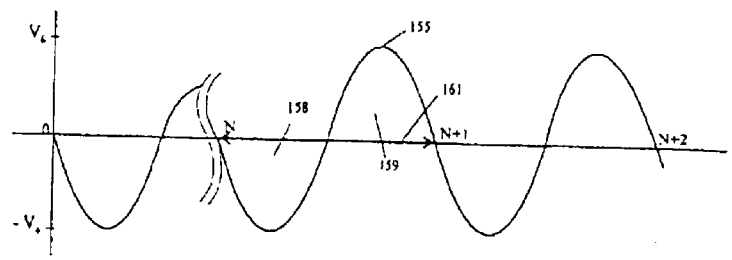

In Eqs. (10) and (14), where one of $l_1$ and $l_2$ is varied according to the object and the other is used as a reference optical path, the initial value applied to the piezo transducer is effective. And it is preferable to measure the object by measuring the variation quantity of the interference fringes given by Eq. (12)rather than by Eq. (10). FIGS. 5A and 5B illustrate waveforms for Eqs. (21) and (22), respectively, showing the cross sections of the waveform shown in FIGS. 2A and 2B. The waveforms are plotted using N$_1$ and N$_2$, multiples of $\lambda_a/2$. Neglecting the term m$_1^{(ext)}$ since m$_1^{(ext)}$ is much smaller than m$_1^{(int)}$, then $\tilde{m}_1 \approx m_i^{(ext)} \theta_i \approx \xi_i$. Thus, $\cos(\theta_1 - \theta_2)$ is defined as a function of $l_1 + l_2$. Therefore, if $l_1 + l_2$ is constant, then $\cos(\theta_1 - \theta_2)$ is constant and $\Omega_0$ is substantially constant. This why the waveform shape in FIG. 5A is different from that in FIG. 5B.

Where $l_1 - l_2$ is constant, the waveform shape is of a pinnacle as shown in FIG. 5A due to effect of $\Omega_0$. And where $l_1 + l_2$ is substantially constant, the waveform shape is of sine wave as shown in FIG. 5B. As shown in Eqs. (21) and (22), each of the waveforms in FIGS. 5A and 5B has a period of $\lambda_a/2$, a half wavelength of the output beam of the ring laser. Since 2 pulses 156 and 157 or 158 and 159 are counted during this period, the pulse width is $\lambda_a/4$. The number of the pulses is counted to thereby measure various physical quantities given by the variation of $l_1 + l_2$ or $l_1 - l_2$.

Figure 6:
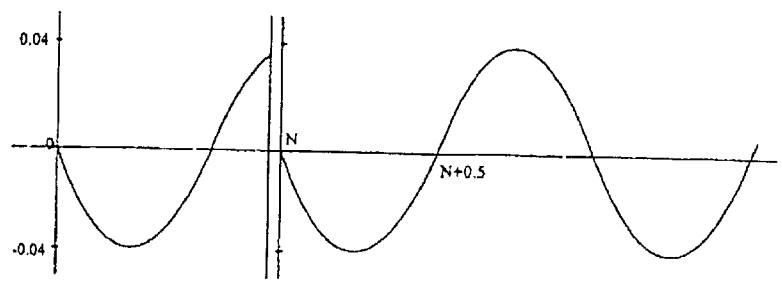
FIG. 6 represents waveform in case only one of $l_1$ and $l_2$ is varied by an object or in case both of $l_1$ and $l_2$ are varied independently.

FIG. 6 is a waveform where, by the object to be measured, only one of $l_1$ and $l_2$ is varied or both $l_1$ and $l_2$ are varied independently each other. In this case, it is difficult to count the pulses because the waveform of Eq. (10) is complex. Therefore, variation of the optical paths is measured by measuring the variation of the interference fringe waveform given by Eq. 12 during the measurement period as described above.

Figure 7:
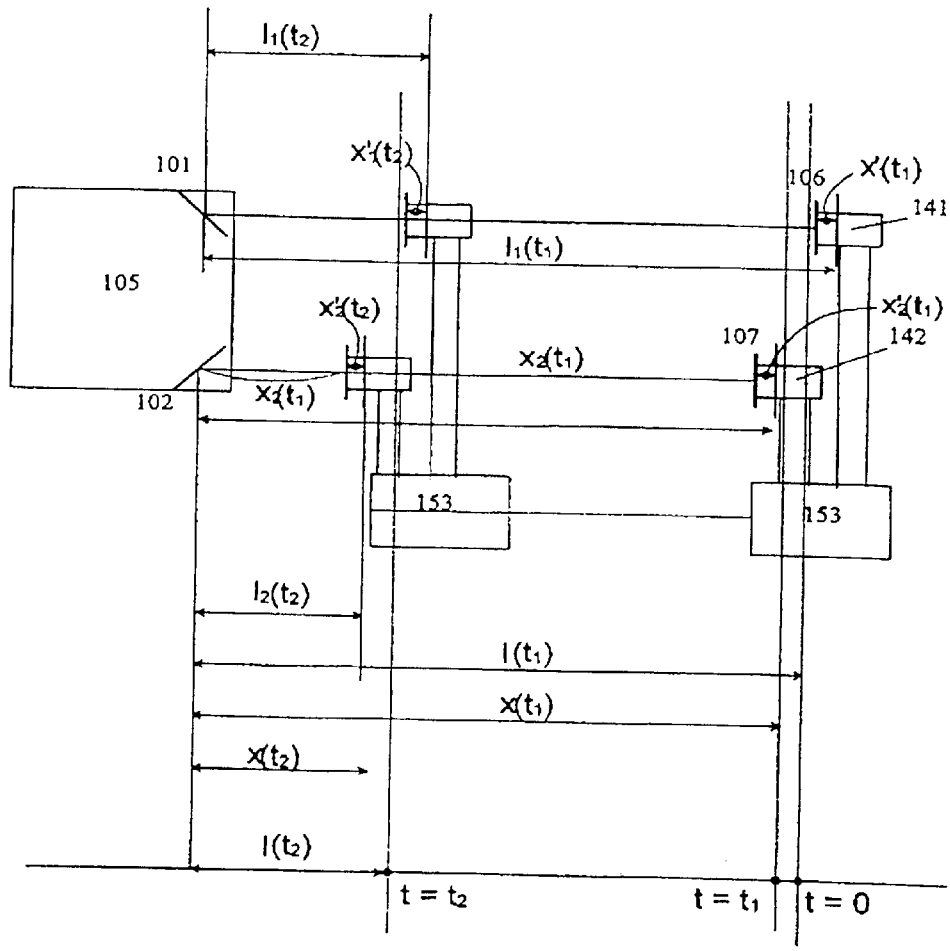
FIG. 7 depicts a plot of the optical path when the two external mirrors are moved by a single platform along an object.

FIG. 7 depicts a function defined on the optical path as similar as shown in FIG. 4, which illustrates the variation of the optical path when the two external mirrors on single platform are moved depending on the object. Since the output of the output amplifier 132 is 0 when the measurement system is turned on at t=0, the voltage applied to the piezo transducers 141 and 142 is then accordingly 0 and thereby the external mirrors 106 and 107 are not moved. Here, the distance between the internal mirror 101 and the external mirror 106 is $l_1(t)$ and the distance between the internal mirror 102 and the external mirror 107 is $l_2(t)$. Because the disturbance occurred to the ring laser 105 at instance of turning on the measurement system, the voltage output of the difference amplifier 130 is generated to be not 0 and such voltage output is integrated by the integrator 131. The voltage output of the integrator 131 is applied to the piezo transducers 141 and 142 after amplified by the output amplifier 132. The piezo transducers 141 and 142 are contracted or expanded based on the applied voltage thereto. And then the external mirrors 106 and 107 are moved by the contraction or expansion of the piezo transducers 141 and 142. By the movement of the external mirrors 106 and 107, the disturbance in the ring laser 105 is reduced and the output voltage of the difference amplifier 130 is also reduced. Accordingly, although increase of the output voltage of the integrator 131 slows down, substantial output voltage increase makes the external mirrors 106 and 107 move to reduce the disturbance in the ring laser 105 and finally the output of the difference amplifier 130 reached 0 after time t$_1$. While the output of the difference amplifier 130 is 0, the output of the integrator 131 does not change and then the voltage applied to the piezo transducers 141 and 142 do not change so that contraction or expansion of the piezo transducers 141 and 142 is stopped and the positions of the external mirrors 106 and 107 does not change. Subsequently, the difference amplifier 130, the integrator 131, the output amplifier 132 and the piezo transducers 141 and 142 construct a negative feedback loop to stabilize the measuring system. Thus, the external mirrors moves in direction opposite to the moving direction of the platform to maintain the length of the optical path constant. The distances that the external mirrors 106 and 107 are moved by the piezo transducers 141 and 142 during time t=0 to t=t$_1$ are represented by x'$_1$(t) and x'$_2$(t), respectively. x'$_1$(t) and x'$_2$(t) are determined based on the voltage applied to the piezo transducers 141 and 142 and thus are calculated by measuring that voltage. At time t==t$_1$, the distance between the internal mirror 101 in the ring laser 105 and the external mirror 106 is x$_1$(t$_1$) and the distance between the internal mirror 102 in the ring laser 106 and the external mirror 106 is x$_2$(t$_2$). If the platform 152 is moved by the object to be measured at t=t$_1$ and this movement is stopped at t=t$_2$, x'$_1$(t) and x'$_2$(t) are can be calculated by achieving the voltage applied to the piezo transducers 141 and 142 since the external mirrors 106 and 107 are moved by the piezo transducers 141 and 142 to make the output of the difference amplifier 130 for stabilization of the system. And the distance between the internal mirror 101 in the ring laser 105 and the external mirror 106 is x$_1$(t$_2$) and the distance between the internal mirror 102 in the ring laser 105 and the external mirror 107 is x$_2$(t$_2$). In this system, when l$_1$(t$_1$)=l$_1$(0)=x$_1$(0), l$_2$(t$_1$)=l$_2$(0)=x$_2$(0), 2x(t$_1$)=x$_1$(t$_1$)+x$_2$(t$_1$), 2x(t$_2$)=x$_1$(t$_2$)+x$_2$(t$_2$), 2x'(t$_1$)=x'$_1$(t$_1$)+x'$_2$(t$_1$), 2x'(t$_2$)=x'$_1$(t$_2$)+x'$_2$(t$_2$), 2l(t$_1$)=l$_1$(t$_1$)+l$_2$(t$_1$) and 2l(t$_2$)=l$_1$(t$_2$)+l$_2$(t$_2$), the distance that the platform is moved is l(t$_2$)--l(t$_1$) and expressed as follows:

$$l(t_2)-l(t_1)=[x(t_2)-x(t_1)]+[x'(t_2)-x'(t_1)] \qquad \text{Eq. (23)}$$

The waveforms of the input/output values of the blocks shown in FIG. 3 generated when the platform varies depending on the moving speed of the platform. Since the optical path difference is not great when refractive index, temperature, stress or pressure is measured, the moving speed of the platform is made as slow as the operating speed of the stabilization circuit. Since the optical path difference is great when displacement or distance is measured, the moving speed of the platform is made fast and the interferometer operates without the stabilization circuit.

Figure 8:
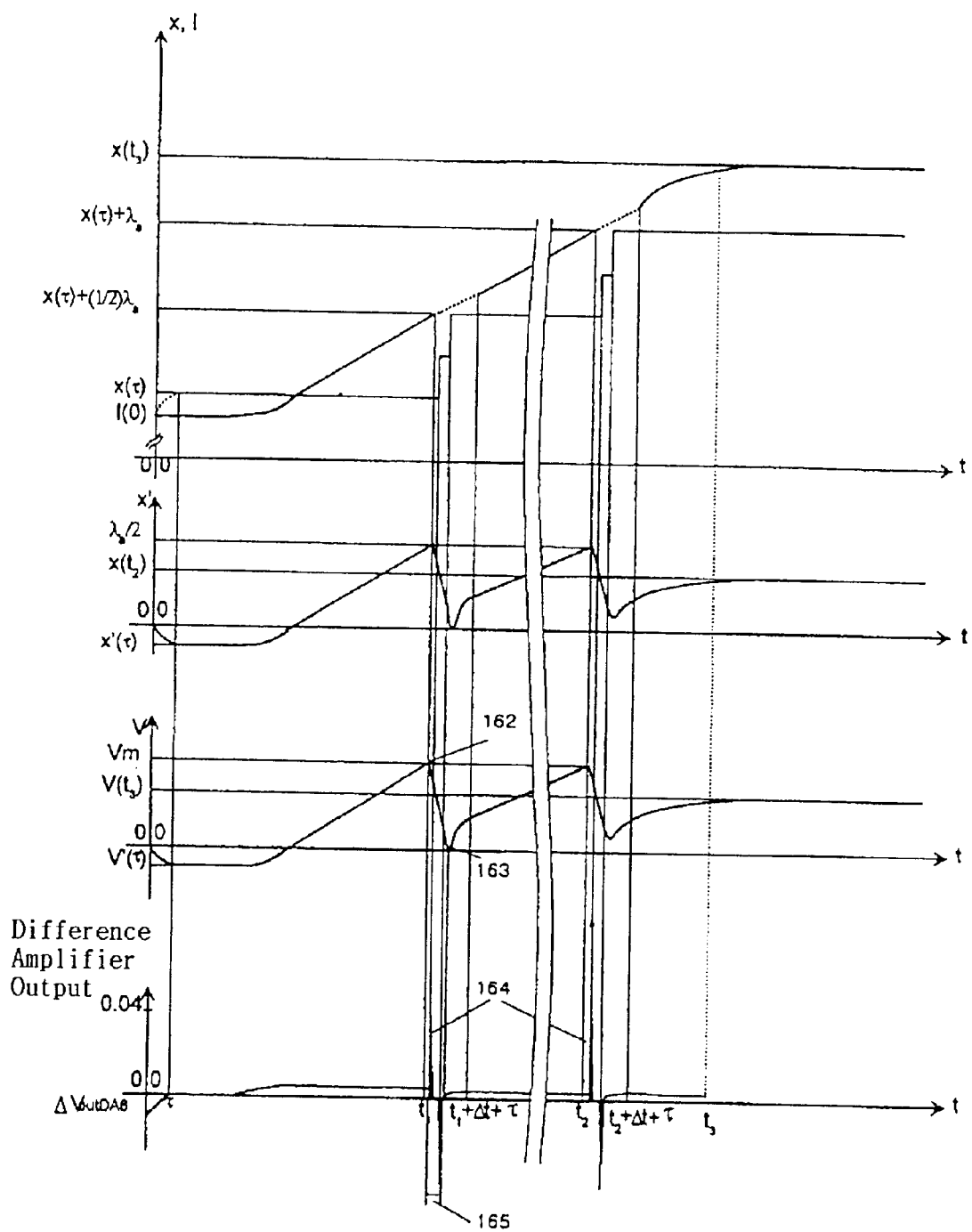
FIG. 8 illustrates graphical diagrams of variation in time for the variables in Eq. (23), an output of a difference amplifier and an input voltage of piezo transducers when the stabilizing circuit operates.

FIG. 8 offers the variations of respective variables in Eq. (23), the output of the output amplifier 132 and the voltage applied to the piezo transducers 141 and 142 when the stabilization circuit operates, that is, the moving speed of the platform is slower than the transducing speed of the piezo transducers 141 and 142. As described above, when the measuring system is turned on at time t=0, the output of the output amplifier 132 is 0, the voltage applied to the piezo transducers 141 and 142 is 0 and then the external mirror 106 and 107 are not moved. At instance of turning the measuring system, negative voltage is generated at the difference amplifier 130 due to the disturbance occurred in the ring laser 105 and this negative voltage is applied to the piezo transducers 141 and 142 after amplified by the output amplifier 132. Thus, the piezo transducers 141 and 142 are contracted by the negative voltage and then the external mirrors 106 and 107 attached on the piezo transducers 141 and 142, respectively, are moved in the direction away from the ring laser 105. Therefore, although l(t)=l(0), x(t) becomes larger than the x(0) by x'(t). Due to that movement, the disturbance in the ring laser 105 is reduced and the output voltage of the difference amplifier 130 is also reduced. And, accordingly, although increase of the output voltage of the integrator 131 slows down, substantial output voltage increase makes the external mirrors 106 and 107 move to reduce the disturbance in the ring laser 105 and finally the output of the difference amplifier 130 reached 0. When the output of the difference amplifier 130 is 0, the output of the integrator 131 does not change and the voltage applied to the piezo transducers 141 and 142 do not change so that the contraction of the piezo transducers 141 and 142 is stopped and the positions of the external mirrors 106 and 107 are not changed. That is, x'(t$_1$) and x(t$_1$) are maintained as constants so that the ring laser 105 stays on stable state.

If the platform is moved in the direction away from the ring laser 105 at time t=t$_1$+τ, the output of the output amplifier 130 is increased and subsequently the piezo transducers 141 and 142 are expanded so that the external mirrors 106 and 107 are moved toward the ring laser 105. As the platform further is moved, the output of the difference amplifier 130 is maintained as a constant by the negative feedback and the output of the integrator 131 increases. And then the output of the output amplifier 132 increases so that the external mirrors 106 and 107 are further moved toward the ring laser 105. When the output of the output amplifier 132 reaches the voltage that expands the piezo transducers 141 and 142 by λ$_a$/2, that is, the voltage V$_m$ where x'(t) becomes λ$_a$/2, the integrator 131 is discharged instantaneously and then the output of the output amplifier 132 is reduced to a value near 0 instantaneously. Therefore, the piezo transducers 141 and 142 moves by λ$_a$/2 during the discharge of the integrator 131 from λ$_a$/2 expanded state to normal state (non-expanded or non-contracted). During the discharge period, the stabilization circuit does not operates and the output of the difference amplifier 132 is the waveform 164 corresponding to the half wavelength as shown in FIG. 5. The time period 165 should be longer than that of the lock-in frequency given by the external mirrors. The stabilization circuit operates the piezo transducers to set off the movement of the platform and then x(t) does not change till the output of the output amplifier 132 reaches the V$_m$ and only x'(t) changes by λ$_a$/2 equal to the distance that the platform is moved. Thus, as the integrator is discharged, x'(t) is reduced to 0 passing λ$_a$/4 and accordingly x(t) is reduced to x(t$_1$+τ)+λ$_a$/4 and subsequently to x(t$_1$+τ)+λ$_a$/2. When the discharge is completed, the output of the difference amplifier 132 increase to compensate the disturbance of the ring laser 105 so that the interferometer is stabilized by the operation of the stabilization circuit, and therefore as the movement of the platform continues those operations described above are repeated. x(t) increases by λ$_a$/2 during the discharge period. If the movement of the platform is stopped at t=t$_2$, then the output of the difference amplifier 130 is made to 0 by the operation of the stabilization circuit and then the voltages of the integrator 131 and the output amplifier 132 so that the interferometer is stabilized. If the number of the output waveforms of the difference amplifier 130 generated during the movement of the platform is m, then Eq. (23) can be represented as follows:

$$l(t_2) - l(t_1) = m\frac{\lambda_a}{4} + [x'(t_2) - x'(t_1)] \qquad \text{Eq. (24)}$$

Figure 9:
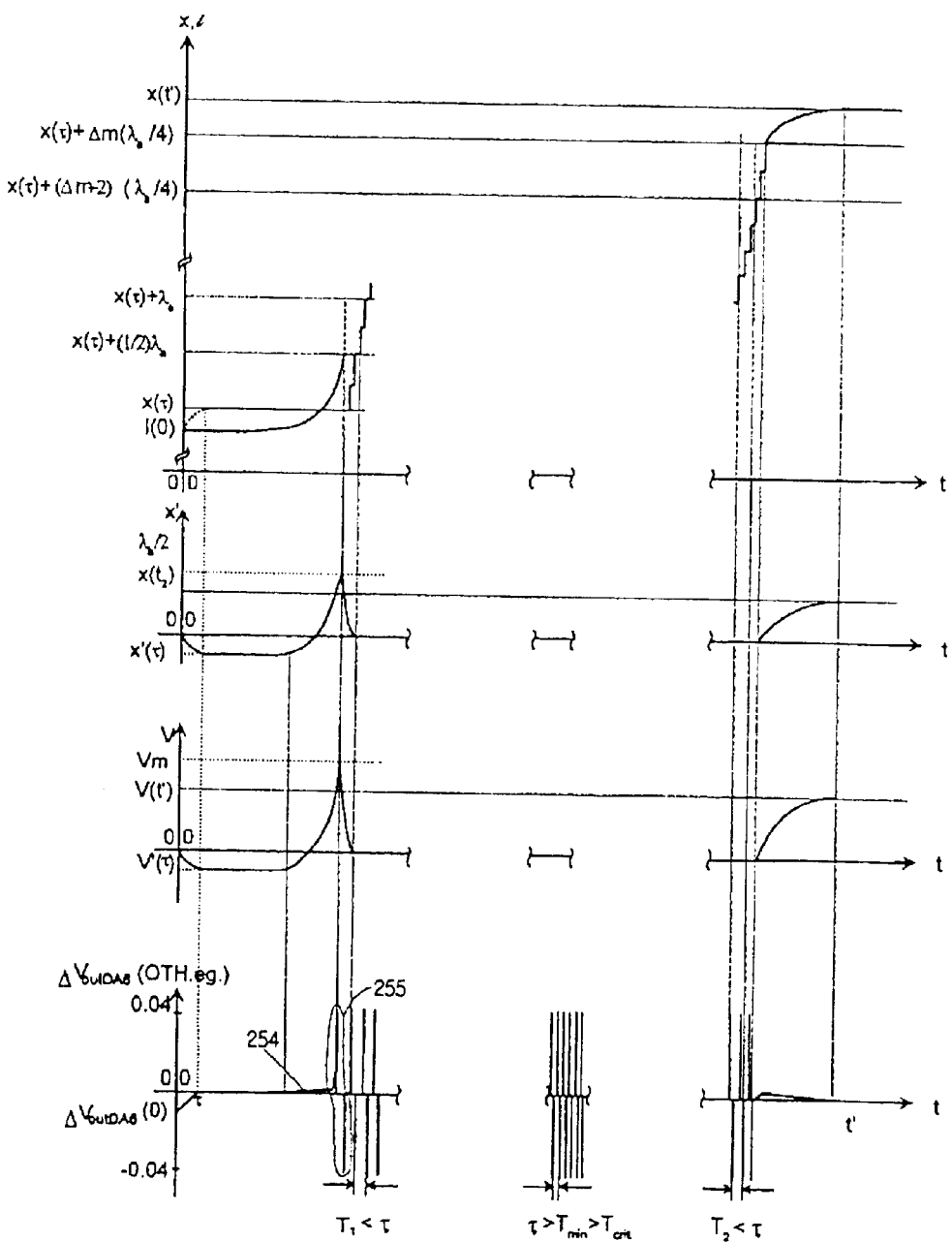
FIG. 9 shows graphical diagrams of variation in time for variables in Eq. (23), an output of a difference amplifier and an input voltage of piezo transducers when the stabilizing circuit does not operate.

FIG. 9 is a timing diagram illustrating the variation in time for the variables in Eq. (23) and variations for the output of the difference amplifier 130 and the voltage applied to the piezo transducers in case the measurement is made when the moving speed of the platform is faster than the transducing speed of the piezo transducers and the stabilization circuit does not operates. As similarly as in FIG. 8, the measuring system is turned on at t=0. However, if the platform is moved faster than the transducing speed of the piezo transducers at t=t$_1$+τ after the interferometer is stabilized, the output of the difference amplifier 130 continuously increases and then the output of the integrator 131 accordingly increases because the disturbance of the ring laser 105 increases with acceleration. Thus, the output of the output amplifier 132 reaches the voltage V$_m$ expanding the piezo transducers by $\lambda_a/2$. Accordingly, the integrator 131 is discharged instantaneously, then the output of the output amplifier 132 is reduces to 0 instantaneously, and the difference amplifier 130 outputs a waveform 255 corresponding to a half wavelength given in FIG. 5. After that because the moving speed of the platform is fast so that the stabilization circuit does not operates, the waveform given in FIG. 5 is generated at the output of the difference amplifier 130. Upon stopping the movement of the platform, the stabilization circuit operates to result in the waveforms as shown in FIG. 8.

Figure 10:
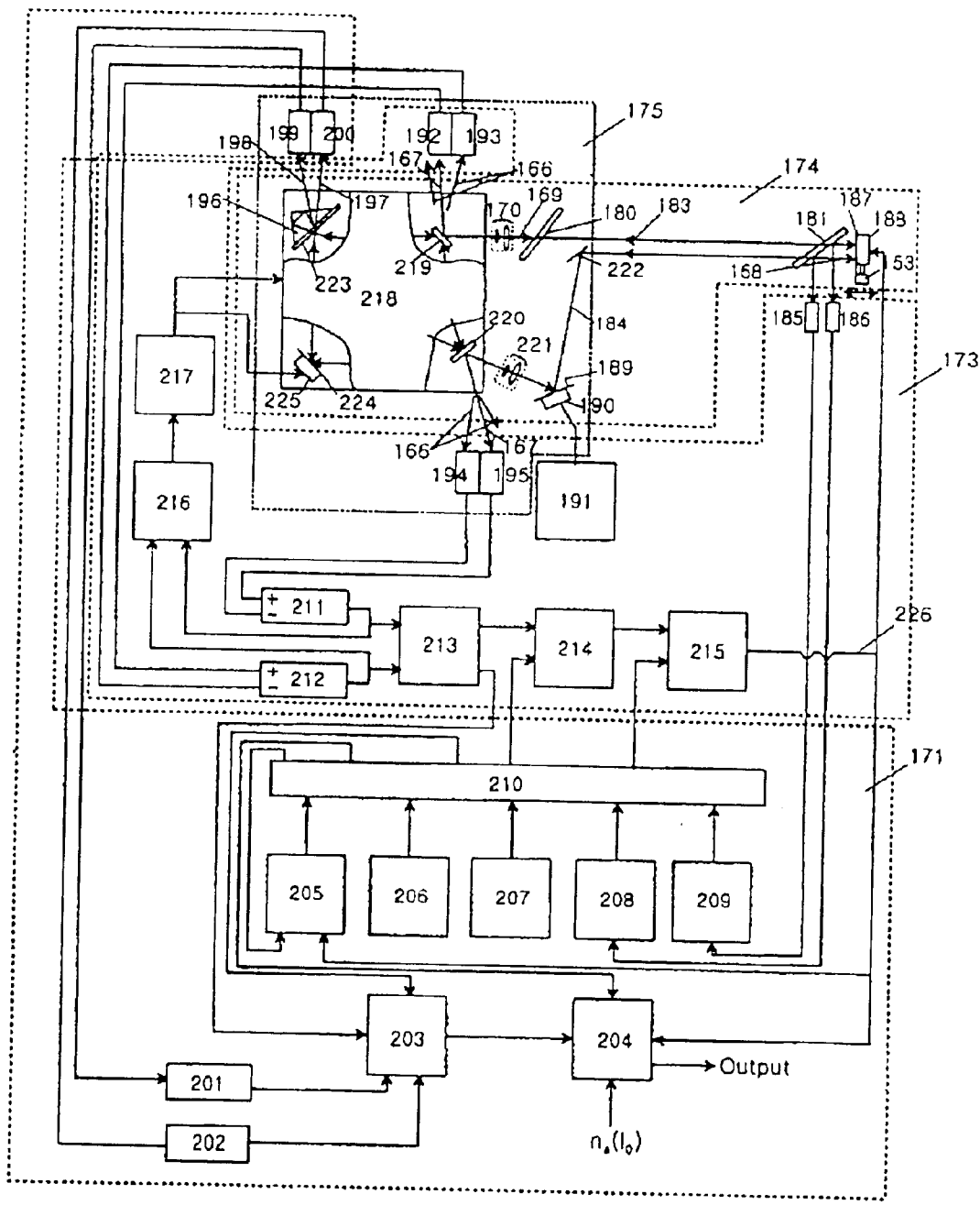
FIG. 10 represents a structural diagram of a ring laser interferometer with accordance to the present invention.

FIG. 10 is a schematic diagram showing system structure of the ring laser interferometer of the present invention. In the optical sensing unit 174, the transmitted beams 169 and 168 are selected, which are generated by transmitting the counter propagating beams in the ring laser 218 through the selected mirrors 219 and 220. The beam 169 is collimated to a collimated beam by the beam collimator 170 and enters the external mirror 187 via the optical attenuator 180 and a beam splitter 181. The beam 168 is reflected by the external mirror 189 attached on the piezo transducer 190 via the beam collimator 221 and again reflected by the external mirror 222 to be parallel with the beam 169 to enter the external mirror 187. The beam 169 is reflected by the external mirror 187 and part of the reflected beam is splitted by the beam splitter 181. Part of the split beam is converted to current by the photo detector 186 and then, after amplified by the amplifier 209, enters the system controller 210. And the remaining part of the split beam enters the ring laser through the mirror 219 along the original path. The beam 168 is reflected by the external mirror 187 and then split by the beam splitter 181. Part of the split beam is converted to current by the photo detector 185 and then, after amplified by the amplifier 208, enters the system controller 210. And the remaining part of the split beam enters the ring laser 218 through the mirror 220 along the original path. The photo detectors 185 and 186 detect the disturbance occurred on the optical path, e.g., measurement error due to extinction of the beams. The external mirror 187 and the piezo transducer 188 attached thereon are mounted on the platform 153 so as to move based on the physical quantity to be measured.

The piezo transducer 190 attached on the external mirror 189 is for controlling the difference amplifier 213 to have maximum difference between its highest voltage output and its lowest voltage output.

Since the cavity of the ring laser 105 is on the plasma state, the beam transmitted through the mirror 219 includes incoherent stray beam 166 due to the gas plasma in addition to the counter propagating waves to make it difficult to measure $I_1-I_2$. Therefore, it is possible to make accurate measurement for $I_1 I_2$ by subtracting the stray beam from $I_1$ and $I_2$ after measuring the intensity of the stray beam 166 separately. The photo detectors 193 and 194 measure the intensity of the stray beam 166. The two counter propagating beams 167 is detected by the photo detectors 192 and 195 and then the intensity of the stray beam 166 is subtracted therefrom by the difference amplifier 211 and 212 to achieve accurate values of $I_1$ and $I_2$. Then, the outputs of the difference amplifier 211 and 212 are applied to another difference amplifier 213 to achieve accurate value of $I_1-I_2$, the difference value of the two counter propagating beams.

The output of the difference amplifier 213 is applied to the output amplifier 215 via the integrator 214. The output 226 of the output amplifier 215 is applied to the piezo transducer 188 attached on the external mirror 187 to stabilize the ring laser 218 and applied to a comparator 205 to discharge the integrator 214 by using the system controller 210 when it is equal to or higher than the reference voltage $V_m$.

The two counter propagating beams through another mirror 223 in the ring laser 218 are combined by the beam combining prism 196 and the cosine component 197 of the combined beam is applied to the amplifier 201 via the photo detector 199 and the sine component 198 is applied to the amplifier 202 via the photo detector 199. The outputs of the amplifiers 201 and 202 are applied to the counter 203 to be used for measurement of the variation of the interference fringes given in Eq. (12). Since it is possible to detect the moving direction of the interference fringes by detecting the cosine and sine components, it is also possible to measure the moving direction of the platform. The counter 203 counts the number of the pulses of the output waveform of the difference amplifier 213. And the system controller 210 controls the counter 203. The output of the counter 203 is applied to the computer 204 for computing and displaying, which is capable of achieving accurate measurement by compensating the physical quantity to be measured by using the accurate refractive index of the physical quantity to be measured, if necessary. It is possible to compensate the accuracy of the physical quantity to be measured by measuring continuously the refractive index associated with measurement environment by using the devices shown in FIG. 12 simultaneously.

Parts of the outputs of the difference amplifiers 211 and 212 are combined by a sum amplifier 216. The output of which includes information for the variation of the cavity length in the ring laser 218 due to temperature change. The output of the sum amplifier 216 drives the piezo transducer 225 attached on another mirror 224 in the ring laser 218 or the cooling device 227, e.g., a fan, for reducing the change of temperature in the ring laser 218 to compensate the effect of the temperature change in the ring laser 218. A timer 206 is used to control the time constant of the integrator 214.

The output of the signal oscillator 207 is an alternating current signal of a constant frequency that is equal to or lower than the resonance frequency of the piezo transducer, and is applied to the other input terminal of the output amplifier 215 via the system controller 210. The output of the signal oscillator 207 vibrates the external mirror prior to measurement. This vibration reduces the measurement error due to diffractive beam generated by grating formed by standing interference fringe generated by interference of the two counter propagating beams on the dielectric coating surface of the internal mirrors 219, 220, 223 and 224. That is, the standing interference fringe on the internal mirrors is eliminated by dispersing the phases of the two counter propagating beams.

The control and display unit 171 is constructed by the system controller 210, the photo detectors 199, 200, 185 and 186, the amplifiers 201, 202, 208 and 209, the counter 203, the computer 204, the comparator 205, the timer 206 and the signal oscillator 207 to perform operation control of the whole system, signal processing and display of measurement result. The stabilization circuit 173 includes the sum amplifier 216 and the output amplifier 217 in addition to, as shown in FIG. 3, the photo detectors 192, 193, 194 and 195, the difference amplifier 211, 212 and 213, the regulated voltage supply 191, the integrator 214. The stabilization circuit 173 also compensates the variation of the cavity length in the ring laser 218 due to the environmental changes. Since it is possible to construct all components in the optical sensing unit 174 and the photo detectors as a mono block 175 except for the external mirror mounted on the moving platform 153, the interferometer can be constructed by three blocks, this fixed mono block, electronic circuit block and the external mirror-associated block.

Figure 11A:
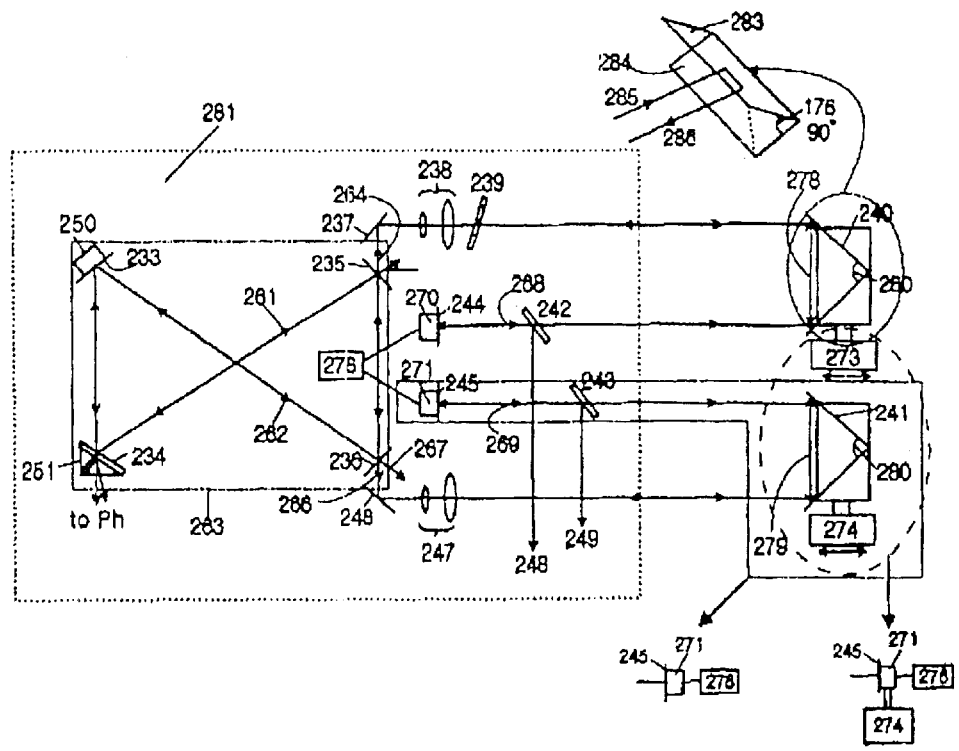
FIGS. 11A and 11B depict structural diagrams of the optical unit of the ring laser interferometer which is not affected by rotation of the ring laser itself.
Figure 11B:
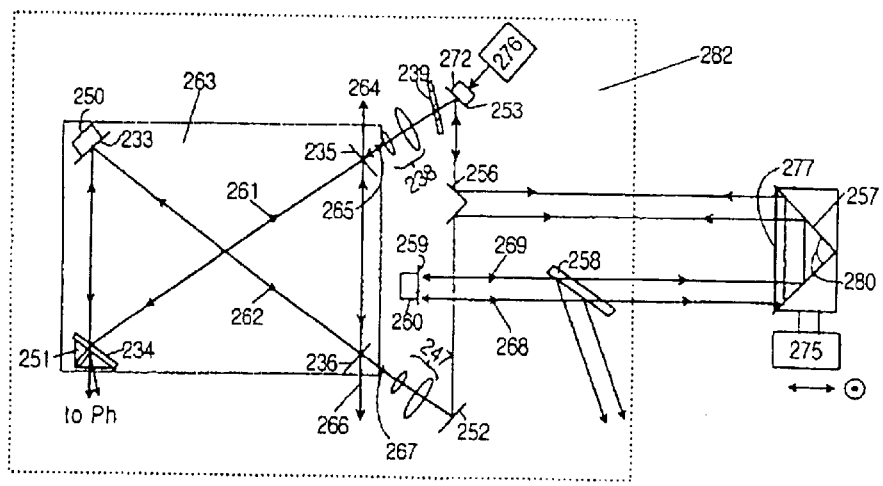

FIGS. 111A and 11B offer the structures of the optical unit of the ring laser interferometer using the ring laser having the cavity structure in which the two counter propagating waves propagate to set off the Sagnac effect due to rotation of the ring laser itself. FIG. 11A shows the case the two external mirrors are moved independently and FIG. 11B shows the case the two external mirrors are on the single platform, that is, the optical path is controlled by the single external mirror 259. In FIG. 11A, the ring laser 263 includes four mirrors 233, 234, 235 and 236 positioned to make the two counter propagating waves 261 and 262 crossed each other.

The transmitted beam 264 through the mirror 235 is reflected from the mirror 237, collimated by the beam collimator 238, reflected, after passing the beam attenuator 239, on the corner cube retroreflector 230 of inner angle 90° or an alternative element and enters, via the beam splitter 242, the external mirror 244 perpendicularly. The reflected beam from the external mirror 244 is split by the beam splitter 242. Part 248 of the split beam is applied to the photo detector to detect the disturbance occurred on the propagation path of the beam 264 and remaining part of the split beam enters the mirror 235 with the direction opposite to the original propagation path.

The transmitted beam 266 through the mirror 236 is reflected on the mirror 246, collimated by the beam collimator 247, reflected on the corner cube retroreflector 241 and enters, via the beam splitter 243, the external mirror 245 perpendicularly. The reflected beam 269 through the external mirror 245 is split by the beam splitter 243. Part 249 of the split beam 266 is applied to the photo detector to detect the disturbance occurred on the propagation path of the beam 266 and remaining part enters the external mirror 236 with the direction opposite to the original propagation path.

As similarly as described above with reference to FIG. 3, the piezo transducers 270 and 271 attached on the external mirrors 244 and 245, respectively, are used to stabilize the interferometer and the other transmitted beams through the mirror 235 and 236 are applied to the difference amplifier and summation amplifier(not shown) via the photo detectors to measure $I_1-I_2$ and $I_1+I_2$.

As similarly as the piezo transducer 225 in FIG. 6, the piezo transducer 250 attached on the external mirror 233 is used to compensate the variation of the cavity length in the ring laser 263 due to the environmental changes, e.g., temperature. As similarly as the beam combining prism 96 in FIG. 10, the beam combining prism attached to the mirror 234 is used to measure the variation of the interference fringe due to the interference between the two counter propagating beams 261 and 262 in the ring laser 263.

The measurement of the physical quantity is enabled by fixing the piezo transducers 270 and 271 attached on the external mirrors 244 and 245, respectively, and moving the platform 273 and 274 on which the corner cube retroreflector 240 and 241 or an alternative element is mounted. Depending upon the kind of the physical quantity to be measured, the corner cube retroreflectors 240 and 241 are moved simultaneously or separately or only one of them is moved. The propagation direction of the transmitted beam 264 reflected on the mirror 237 is parallel with the moving direction of the platform and perpendicular to the sectional surface 278 of the corner cube retroreflector 240. It will be preferable that the sectional surface 278 of the corner cube retroreflector 240 is parallel with the external mirror 244. The propagation direction of the transmitted beam 266 reflected on the mirror 246 is parallel with the moving direction of the platform 274 and perpendicular to the sectional surface 279 of the corner cube retroreflector 241. It will be also preferable that the sectional surface 279 of the corner cube retroreflector 241 is parallel with the external mirror 245. It is possible to construct the reference optical path by using only one of the corner cube retroreflectors and move the external mirror based on the physical quantity to be measured in FIG. 11B. And it is also possible to construct the reference optical path by using the external mirror and move the corner cube retroreflector based on the physical quantity to be measured.

In FIG. 11B, the transmitted beam 265 through the mirror 235 is collimated by the beam collimator 238, reflected, via the attenuator 239, on the mirror 253, again reflected on one side of the two-side mirror 256 and enters the external mirror 259 via the corner cube retroreflector 257 and the beam splitter 258. Part of the beam 268 reflected on the external mirror 259 is applied to the photo detector by the beam splitter 258 and the remaining part enters the ring laser 263 through the mirror 235 along the direction opposite to the original propagation path.

The transmitted beam 267 through the mirror 236 is collimated by the beam collimator 247, reflected from the mirror 252, again reflected on the other side of the two-side mirror 256 and enters the external mirror 259 via the corner cube retroreflector 257 and the beam splitter 258. Part of the beam 269 reflected on the external mirror 259 is applied to the photo detector by the beam splitter 258 and the remaining part enters the ring laser 263 through the mirror 236 along the direction opposite to the original propagation path. The transmitted beams 265 and 267 propagate parallel to each other after reflected on the two-side mirror 256. And the transmitted beams 265 and 267 should be parallel with the moving direction of the platform 275 on which the corner cube retroreflector 257 is mounted. The front furnace 272 of the corner cube retroreflector 257 should be parallel to the external mirror 259. The piezo transducer 272 attached on the mirror 253 is used to control, by using the regulated voltage supply, the difference amplifier to have maximum difference between the highest voltage output and the lowest voltage output, that is, maximum peak waveform. The piezo transducer 260 attached on the external mirror 259 is used to stabilize the interferometer as the corner cube retroreflector 257 is moved by the platform 275.

The piezo transducer 250 attached on the mirror 233 is used to compensate the variation of the cavity length in the ring laser 263 due to the measurement environment changes. The beam combining prism 251 attached on the mirror 234 is used to measure the variation of the interference fringe due to the interference between the two counter propagating beams 261 and 262 in the ring laser 263.

The corner cube retroreflector 240, 241 and 257 are constructed by joining two mirror 283 and 284 to have the inner angle 90° and inner reflecting sides. The incident beam 285 is reflected on the mirrors 283 and 284 to be the beam 286 which is parallel with the incident beam 285 and on the same plane. The mirrors 246, 252, 253 are able to rotate to make the beams 268 and 269 parallel. The polarization direction of the two counter propagating waves in the ring laser 263 should be identical with each other. In FIGS. 11A and 11B, all parts may be constructed as mono-blocks 281 and 282 except for the corner cube retroreflector 240, 241 and 257 or the alternative elements and the platform 273, 274 and 275.

Figure 12A:
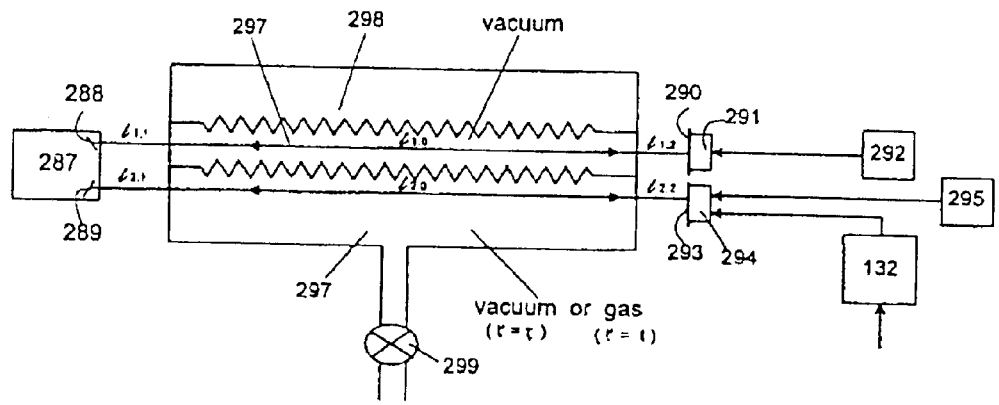
FIGS. 12A and 12B illustrate structural diagrams of the optical sensing unit of the interferometer.
Figure 12B:
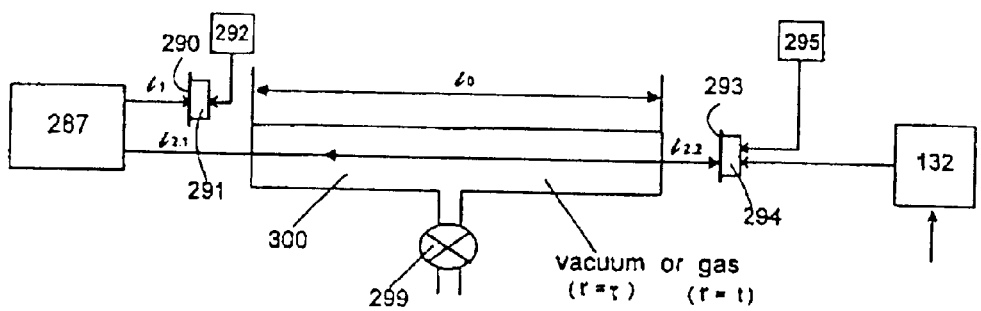

FIGS. 12A and 12B provide the structure of the optical sensing unit of the inventive interferometer capable of changing the only one of optical paths on $l_1$ and $l_2$ by the object without changing the physical distance between the mirror in the ring laser and the external mirror. FIG. 12A depicts the case $l_1$ includes the measurement cell. FIG. 12B depicts the case $l_1$ does not include the measurement cell.

In FIG. 12A, the transmitted beam through the mirror 288 in the ring laser 287 produced from the two counter propagating beams in the ring laser 287 enters the external mirror 290 and the transmitted beams through the mirror 289 in the ring laser 287 enters the external mirror 293. The external mirrors 290 and 293 are aligned to have the incident beams thereto and the reflected beams therefrom be parallel with each other and on the same plane. The measurement cell 298 is divided as a vacuum section 297 through which the reference beam is transmitted and another vacuum section 296 which will be fill with the gas corresponding to the physical quantity to be measured and through which the measuring beam is transmitted. The gas corresponding to the physical quantity to be measured is injected passing the stopper 299. The piezo transducer 291 is attached on the external mirror 290 and initially stabilized by the regulated voltage supply 292. And the piezo transducer 294 is attached on the external mirror 293 and initially stabilized by the regulated voltage supply 295. When the interferometer is turned on at t=0, the ring laser is stabilized by the initial voltage of the regulated voltage supply and the output amplifier. If the gas corresponding to the physical quantity to be measured is injected at $t=t_1$, then thereby the optical path is changed and the output based on Eq. (12) is generated.

FIG. 12B is the case the reference beam does not transmit through the measurement cell 300 which is vacuum and later the gas is injected thereto.

The output of the inventive interferometer is the variation rate of the interference fringe due to the intensity sum, the intensity difference and the phase difference, between the two counter propagating wave. Part of that output is fedback negatively to suppress or set off the variations of output beam intensity and frequency of the ring laser, due to input voltage change and other environmental effect so that accurate measurement can be achieved. And the effect of the minute movement of the ring laser on the measurement is minimized by operating the ring laser within the lock-in zone.

While the present invention has been shown and described with respect to the particular embodiments, it will be apparent to those skilled in the art that many changes and modifications may be made without departing from the spirit and scope of the invention as defined in the appended claims.

What is claimed is:

1. An optical interferometric sensing apparatus for measuring a refractive index of an object, comprising:

a ring laser cavity for generating four laser beams, two of said four laser beams propagating away from said ring laser cavity in a first direction and the remaining two laser beams propagating away from said ring laser cavity respectively in second and third directions;

two external mirrors, said two laser beams propagating in the first direction being reflected off from the respective external mirrors to be directed back to said ring laser cavity, said object being placed along an optical path between said ring laser cavity and one of said two external mirrors;

two sensors respectively positioned to measure intensities of said remaining two laser beams; and means for calculating a refractive index of said object based on the measured intensities, wherein the apparatus operates in four operational modes when the optical path lengths between said ring laser cavity and said two external mirrors are respectively $l_1$ and $l_2$, and the four operational modes include:

one of the optical path lengths $l_1$ and $l_2$ is varied, the optical path lengths $l_1$ and $l_2$ are varied while maintaining $\pm(l_1-l_2)$ constant, the optical path lengths $l_1$ and $l_2$ are varied while maintaining $(l_1+l_2)$ constant, and the optical path lengths $l_1$ and $l_2$ are independently varied.

2. The apparatus of claim 1, wherein said two laser beams propagating in the first direction and the two reflected laser beams back to said ring laser cavity are parallel to each other and placed on a same plane.

3. The apparatus of claim 1, wherein said ring laser cavity operates within a lock-in zone.

4. The apparatus of claim 1, wherein said ring laser cavity is unaffected by the rotation of said ring laser cavity.

5. The apparatus of claim 1, wherein said ring laser cavity has at least 3 internal mirrors.

6. The apparatus of claim 1, further comprising:

an optical attenuating means for controlling finely intensities of the two reflected laser beams.

7. The apparatus of claim 1, further comprising:

at least one platform for mounting thereon at least one of said two external mirrors.

8. The apparatus of claim 7, wherein the optical path lengths $l_1$ and $l_2$ are respectively controlled by said two external mirrors and simultaneously changed so that $\pm(l_1-l_2)$ is constant, whereby said at least one platform moves simultaneously said two external mirrors.

9. The apparatus of claim 1, wherein the optical path lengths $l_1$ and $l_2$ are respectively controlled by said two external mirrors and interactively changed so that $(l_1+l_2)$ is constant, and the apparatus further comprises two platforms, each for mounting one of said two external mirrors, for moving interactively said two external mirrors.

10. The apparatus of claim 1, further comprising:

two or more beam collimating means placed on the optical paths, wherein said two or more beam collimating means collimate said two laser beams propagating in the first direction, and then apply the two collimated laser beams into said two external mirrors.

11. The apparatus of claim 1, wherein the optical path lengths $l_1$ and $l_2$ are simultaneously controlled by one of said two external mirrors and simultaneously varied so that $\pm(l_1-l_2)$ is constant.

12. The apparatus of claim 11, further comprising:

a collimating optics for collimating said two laser beams propagating in the first direction as two collimated neighboring beams to be applied to said one external mirror.

13. The apparatus of claim 5, wherein said ring laser cavity is configured such that two of said four laser beams cross each other in order to eliminate the effect of rotation of said ring laser cavity, when each of the two crossed laser beams in said ring laser cavity is traveling toward a corresponding one of said internal mirrors, which is disposed at a diagonal direction from each of two neighboring internal mirrors of said internal mirrors.

14. The apparatus of claim 1, further comprising:

one or more corner cubes for changing the direction of said two laser beams propagating in the first direction to 360 degrees to direct said two laser beams to said two external mirrors which are fixed to said ring laser cavity.

15. The apparatus of claim 14, further comprising:

at least one moving platform for mounting said one or more corner cubes thereon.

16. The apparatus of claim 14, wherein an entrance pupil of each of said one or more corner cubes is positioned parallel to the front side of each of said two external mirrors.

17. The apparatus of claim 14, further comprising:
at least one collimating optics for collimating said two laser beams propagating in the first direction as two collimated neighboring beams;
wherein one of said one or more corner cubes is used to direct the two collimated neighboring beams to a corresponding one of said two external mirrors fixed to said ring laser cavity.

18. The apparatus of claim 1, further comprising:
a vacuum cell positioned to construct the optical paths,
wherein the vacuum cell includes two vacuum units, each of which constitutes a part of its corresponding one of the optical paths, and
wherein one of the two vacuum units maintains a vacuum state and the other of the two vacuum units is filled with said object to measure the refractive index of said object.

19. The apparatus of claim 1, further comprising:
a vacuum cell positioned on selected one of the optical paths,
wherein the vacuum cell is filled with said object.

20. The apparatus of claim 1, wherein one of the optical paths is changed and the other of the optical paths is fixed as a reference optical path.

21. An optical interferometer sensing apparatus, comprising:
a ring laser cavity for generating four laser beams, two of said four laser beams propagating away from said ring laser cavity in a first direction and the remaining two laser beams propagating away from said ring laser cavity respectively in second and third directions;
two external mirrors, said two laser beams propagating in the first direction being reflected off from the respective external mirrors to be directed back to said ring laser cavity;
two sensors respectively positioned to measure intensities of said remaining two laser beams; and
means for calculating a distance between said ring laser cavity and one of said two external mirrors based on the measured intensities,
wherein the apparatus further comprises:
one or more platforms for changing optical path lengths between said ring laser cavity and said two external mirrors; and
a counting means for counting the number of pulses of a waveform given by a variation rate in time of the waveform generated by the difference between intensities of the remaining two laser beams in said ring laser cavity based on the change of the optical path lengths,
wherein the distance to be measured is determined from the counted number of the pulses.

22. The apparatus of claim 21, further comprising:
means for measuring a variation rate of an interference fringe produced by the interference of the remaining two laser beams,
wherein the distance is measured by using one of the counted number of the waveforms and the variation rate of the interference fringe.

23. The apparatus of claim 22, further comprising:
a beam combining prism for combining two of said four laser beams; and
photo-detectors for detecting sine and cosine components of the combined beam from the beam combining prism,
wherein the variation rate of the interference fringe is measured based on the detected sine and cosine components.

24. The apparatus of claim 21, further comprising:
piezo-transducers for controlling finely internal mirrors of said ring laser cavity;
a summing amplifier for measuring a sum of the intensities of the remaining two laser beams; and
an output amplifier for amplifying the output of the summing amplifier to a predetermined level to be applied to the piezo-transducers,
wherein the variation of a length of said ring laser cavity due to a temperature change is compensated by controlling finely said internal mirrors by means of the piezo-transducers.

25. The apparatus of claim 21, further comprising:
a cooling means for cooling the body of said ring laser cavity;
a summing amplifier for measuring a sum of the intensities of the remaining two laser beams; and
an output amplifier for amplifying the sum from the summing amplifier to a voltage level required to drive the cooling means so that the length variation of said ring laser cavity due to a temperature change is compensated.

26. The apparatus of claim 21, further comprising:
one or more piezo-transducers attached on said two external mirrors for finely moving said two external mirrors,
wherein a voltage applied to said one or more piezo-transducers is generated by using the difference between the intensities of the remaining two laser beams in said ring laser cavity.

27. The apparatus of claim 21, further comprising:
one or more piezo-transducers attached on said two external mirrors for finely moving said two external mirrors; and
a regulated voltage supplier for applying a predetermined voltage to said one or more piezo-transducers,
wherein the regulated voltage supplier determines an initial input voltage applied to said one or more piezo-transducers, so that the peak of the waveform given by the difference between the intensities of the remaining two laser beams in said ring laser cavity is maximized.

28. The apparatus of claim 26, wherein each of said one or more piezo-transducers includes two input terminals, the voltage generated being applied to one of the two input terminals, and
the apparatus further comprises:
a regulated voltage supplier for applying a regulated voltage to the remainder of the two input terminals,
wherein the regulated voltage supplier applies the regulated voltage so that the peak of the waveform given by the difference between the intensities of the remaining two laser beams in said ring laser cavity is maximized.

29. The apparatus of claim 26, further comprising:
a stabilization means, and
the stabilization means includes:
a difference amplifier for measuring the difference between the intensities of the remaining two laser beams;
an integrator for integrating the output of the difference amplifier; and
an output amplifier for amplifying the output of the integrator to a voltage level required to drive said one or more piezo-transducers.

30. The apparatus of claim 29, wherein said one or more piezo-transducers discharge instantaneously the integrator to make the output of the output amplifier zero, when an oscillating wavelength of said ring laser cavity is contracted and/or expanded by a factor of ½.

31. The apparatus of claim 21, further comprising:
first photo-detectors for detecting the remaining two laser beams propagating away from said ring laser cavity through two neighboring internal mirrors in said ring laser cavity;
second photo-detectors for measuring an incoherent optical component due to a gas plasma in said ring laser cavity transmitted through the two neighboring internal mirrors with the remaining two laser beams; and
difference amplifiers for subtracting the incoherent optical component from the amplitude of each of the remaining two laser beams detected by the first photo-detectors.

32. The apparatus of claim 21, further comprising:
an additional external mirror for collimating said two laser beams propagating in the first direction as collimated neighboring beams;
a piezo-transducer attached on the additional external mirror; and
a regulated voltage supplier for applying a regulated voltage to the piezo-transducer,
wherein the regulated voltage supplier applies the regulated voltage to the piezo-transducer so that the peak of the difference between the intensities of the remaining two laser beams in said ring laser cavity is maximized.

33. The apparatus of claim 32, wherein the collimated neighboring beams enter one of said two external mirrors and said one external mirror controls simultaneously optical path lengths corresponding to $l_1$ and $l_2$ to maintain $(l_1-l_2)$ as a constant, when $l_1$ and $l_2$ are distances of the optical path lengths between the two neighboring internal mirrors and said one external mirror.

34. The apparatus of claim 29, wherein an alternating signal of a certain frequency, which is equal to or lower than a resonant frequency of said one or more piezo-transducers, is applied to the output amplifier in the stabilization means in addition to the output of the integrator to oscillate said one or more piezo-transducers and to eliminate a diffractive wave due to a grating produced on a dielectric coating of each of said internal mirrors by the interference of the remaining two laser beams, thereby eliminating interference fringes on said internal mirrors.

35. The apparatus of claim 21, further comprising:
one or more beam splitting means for splitting the two reflected laser beams on the optical paths, a part of each of the split beams being used to detect the disturbance occurred in each of the optical paths.

36. The apparatus of claim 21, further comprising:
a second optical sensing means for measuring the variation of a refractive index of an object to compensate the refractive index variation, to thereby improve the measurement accuracy of the apparatus.

37. The apparatus of claim 29, wherein the output of the difference amplifier is determined depending on the relation of the optical path lengths while the integrator is discharged, the output of the difference amplifier generating one period of a waveform having a half wavelength of an output beam of said ring laser cavity.

38. The apparatus of claim 30, wherein the output of the difference amplifier generates one period of a pinnacle shape waveform series, by a half wavelength of the oscillating wavelength of said ring laser cavity at every movement of said one or more platforms.

39. The apparatus of claim 30, wherein the output of the difference amplifier generates one period of a sine waveform series, by a half wavelength of the oscillating wavelength of the ring laser at every movement of said one or more platforms.

40. The apparatus of claim 29, wherein the stabilization means is inactive and the output of the difference amplifier is a consecutive waveform of the pinnacle shape while a moving speed of said one or more platforms is faster than a transducing speed of said one or more piezo-transducers.

41. The apparatus of claim 29, wherein the stabilization means is active and the output of the difference amplifier is a consecutive sine waveform while a moving speed of said one or more platforms is slower than a transducing speed of said one or more piezo-transducers.

42. The apparatus of claim 37, wherein the output of the difference amplifier generates one period of one of a pinnacle shape waveform and a sine waveform while the integrator is discharged.

43. The apparatus of claim 36, wherein the refractive index given by the variation of the optical path lengths equals to a sum of a distance that said two external mirrors are moved by said one or more piezo-transducers before and after the change of the optical paths by the stabilization means and a product value of the counted number of the output waveforms of the difference amplifier during the movement of said one or more platforms and a quarter of the oscillating wavelength of said ring laser cavity.

44. The apparatus of claim 21, wherein the optical sensing means is constructed as a mono-block except for said two external mirrors attached on said one or more platforms so that the apparatus is constructed by the mono-block, an electronic circuit, and an external mirror-associated block.

45. The apparatus of claim 15, wherein the apparatus is constructed as a mono-block except for said one or more corner cubes attached on said at least one moving platform.

46. The apparatus of claim 45, wherein one of said two external mirrors is attached on said ring laser cavity and the other of said two external mirrors operates on a reference optical path of the optical paths.

47. The apparatus of claim 46, wherein an optical path of the optical paths constructed by said one external mirror attached on said ring laser cavity and said one or more corner cubes is fixed as the reference optical path and an optical path constructed by the other external mirror is changed based on the refractive index to be measured.

48. The apparatus of claim 26, wherein the refractive index is measured by calculating the variation of the output waveform from the beam combining prism when both and/or only one of the optical path lengths of the second optical sensing means are changed by an object to be measured.

49. The apparatus of claim 36, wherein the refractive index is proportional to a sum of a distance that said one or more external mirrors are moved by said one or more piezo-transducers before and after the change of the optical paths by the stabilization means and a product value of the counted number of the output waveforms of the difference amplifier during the movement of said one or more platforms and a half of the oscillating wavelength of said ring laser cavity.

* * * * *